Figure 1:
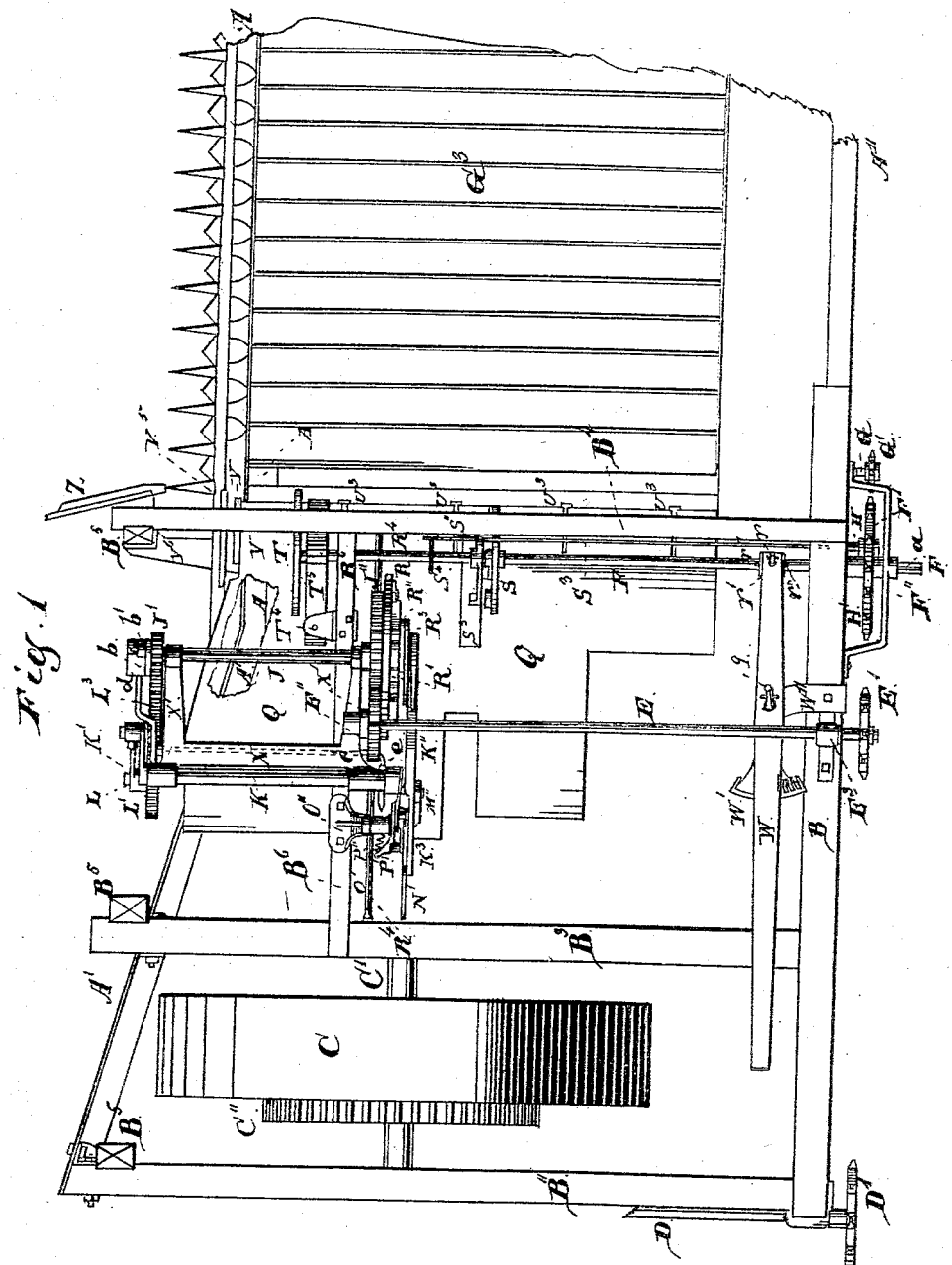

(Model.)    12 Sheets—Sheet 1.

W. W. MARSH & M. E. BLOOD.
GRAIN BINDING HARVESTER.

No. 321,511.    Patented July 7, 1885.

Witnesses:
Albert H. Adams
Edgar T. Bond

Inventors:
William W. Marsh
Maurice E. Blood.
By West & Bond
Their attys.

(Model.) 12 Sheets—Sheet 2.
W. W. MARSH & M. E. BLOOD.
GRAIN BINDING HARVESTER.
No. 321,511. Patented July 7, 1885.
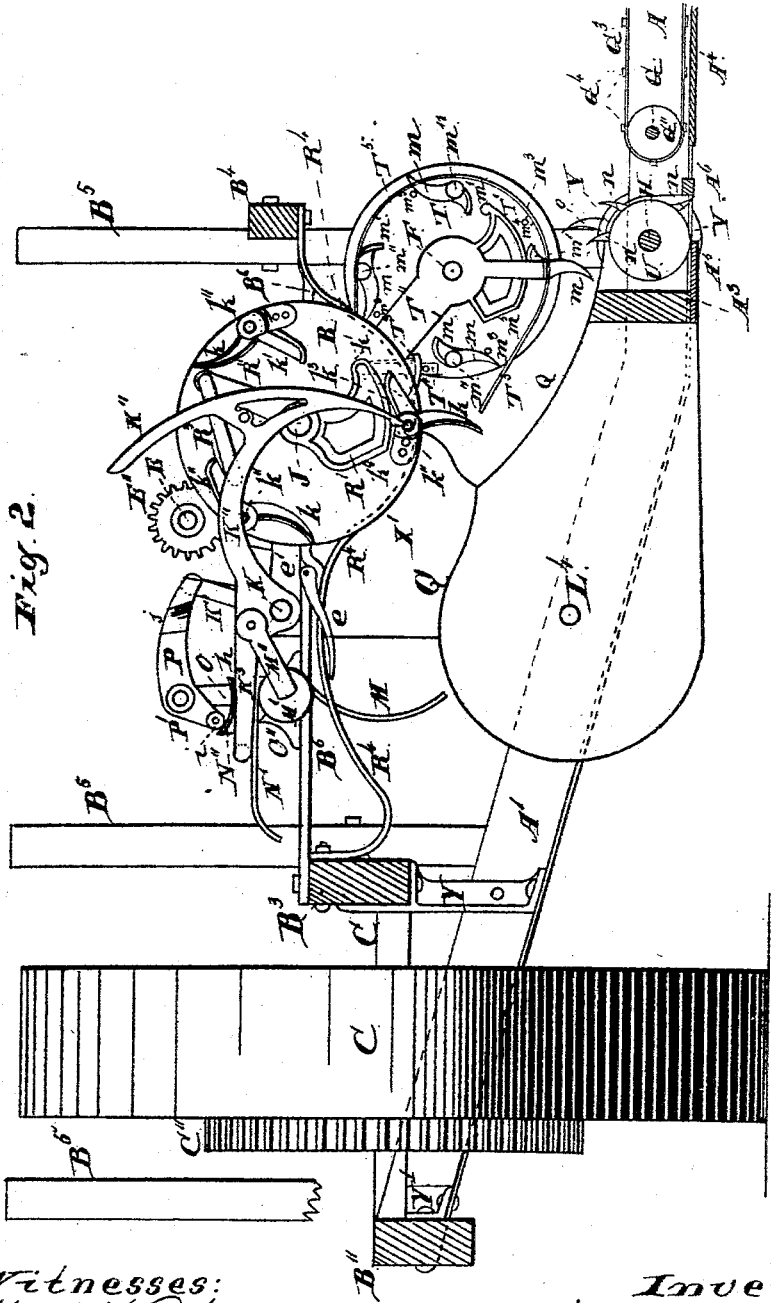

(Model.) 12 Sheets—Sheet 3.
W. W. MARSH & M. E. BLOOD.
GRAIN BINDING HARVESTER.
No. 321,511. Patented July 7, 1885.
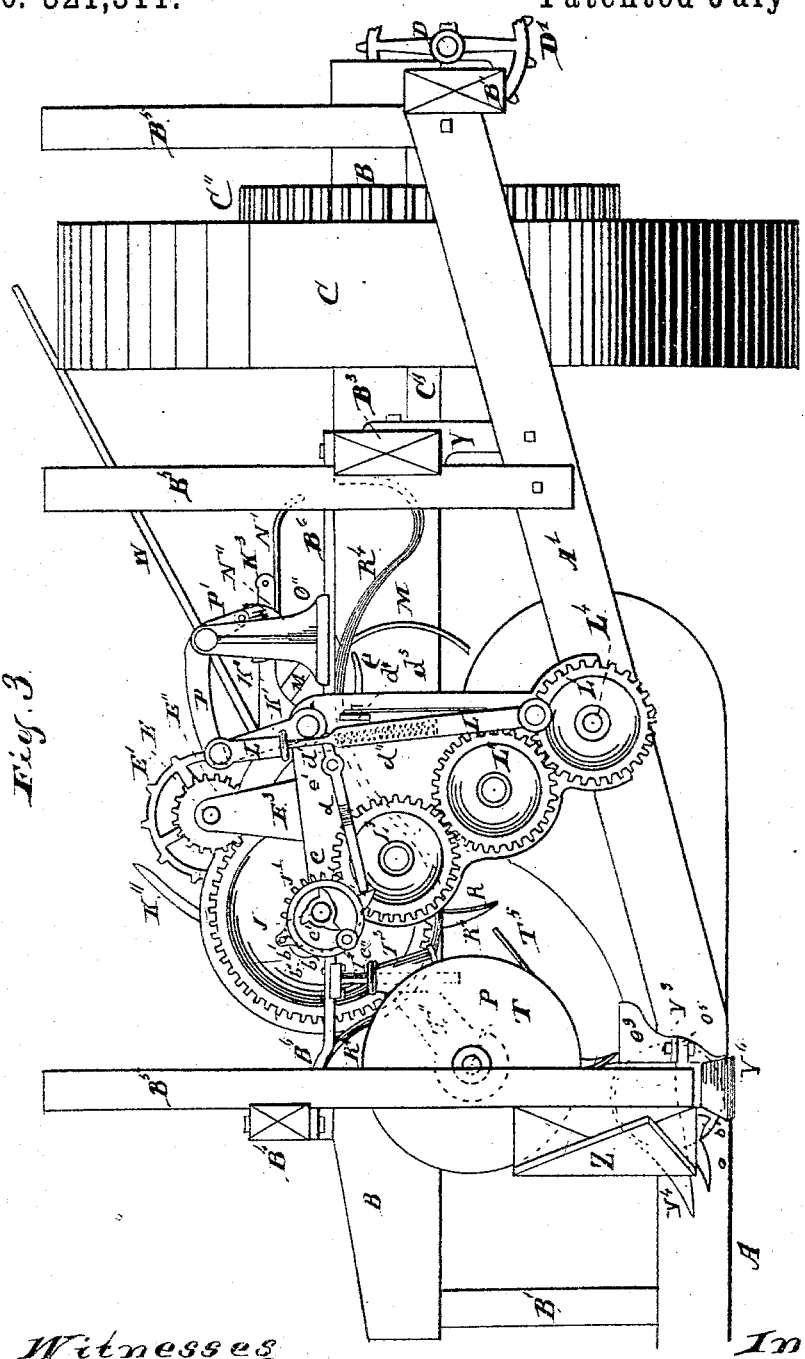
Witnesses
Albert H. Adams
Edgar J. Bond
Inventors:
William W. Marsh
Maurice E. Blood
By West & Bond
Their Attys.

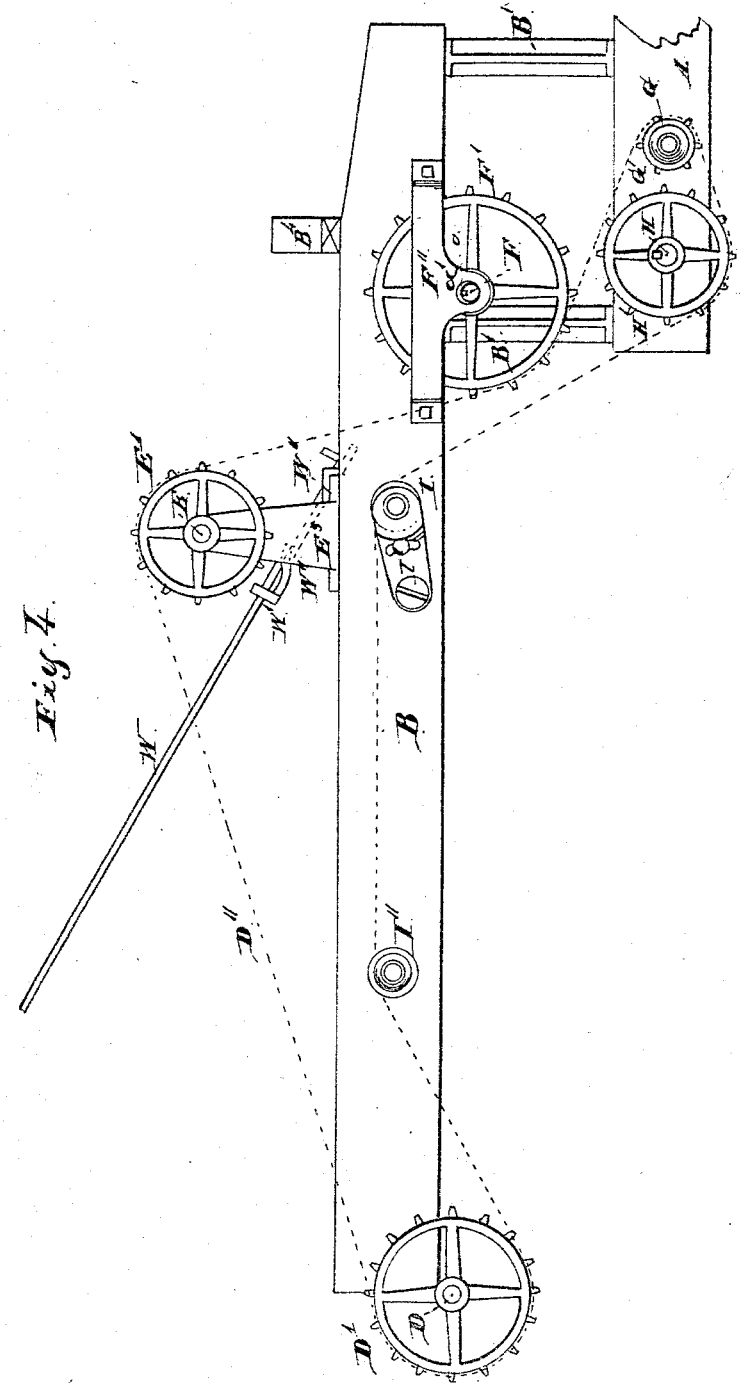

(Model.) 12 Sheets—Sheet 5.
W. W. MARSH & M. E. BLOOD.
GRAIN BINDING HARVESTER.
No. 321,511. Patented July 7, 1885.
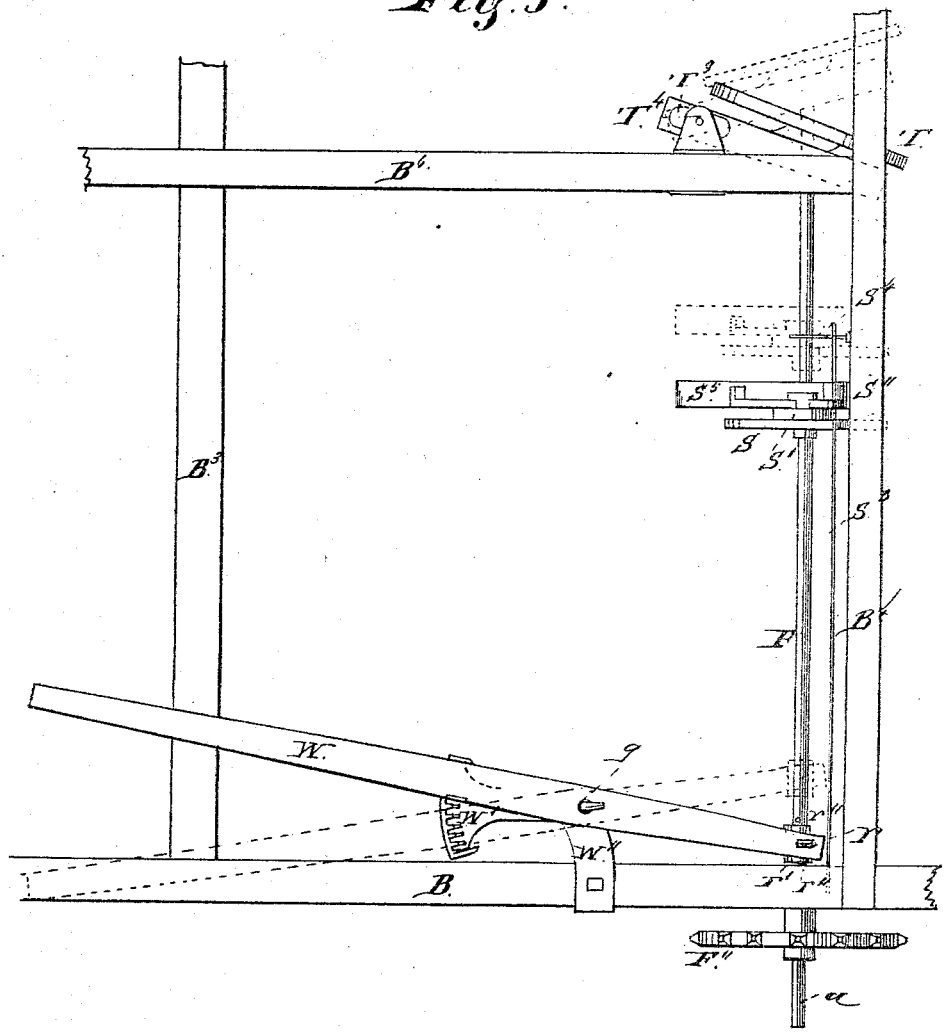

(Model.)    W. W. MARSH & M. E. BLOOD.
GRAIN BINDING HARVESTER.
No. 321,511.                    Patented July 7, 1885.
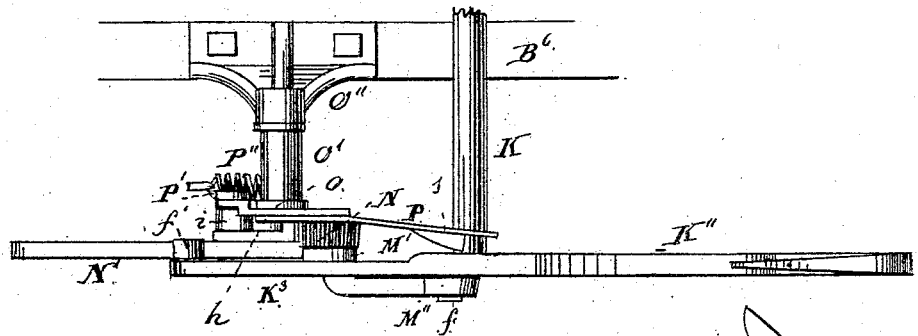
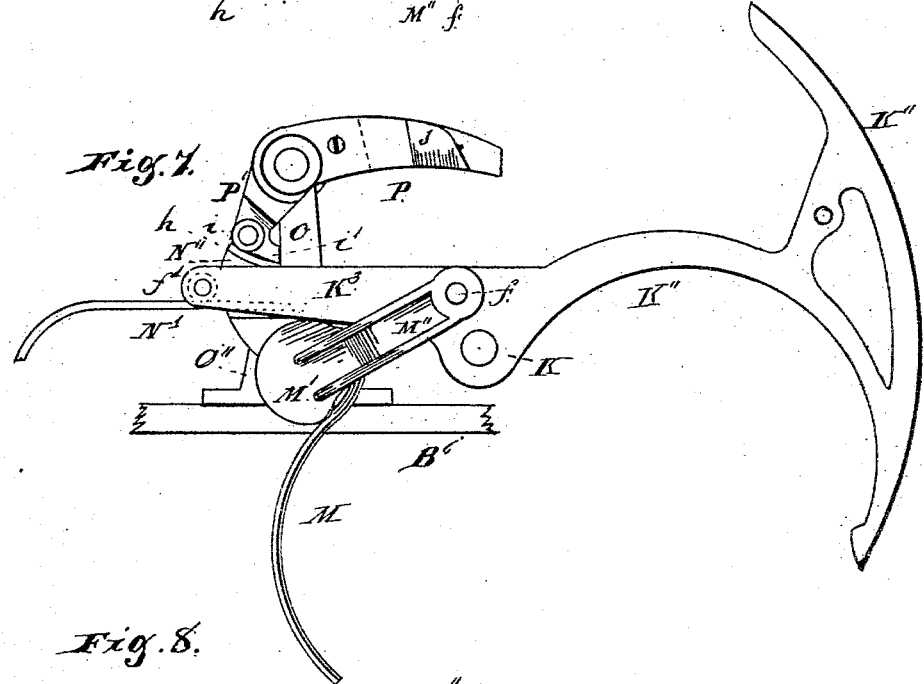
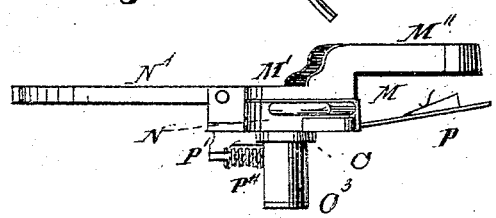

(Model.)
12 Sheets—Sheet 7.
W. W. MARSH & M. E. BLOOD.
GRAIN BINDING HARVESTER.
No. 321,511. Patented July 7, 1885.
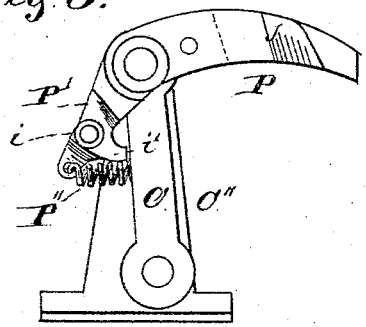
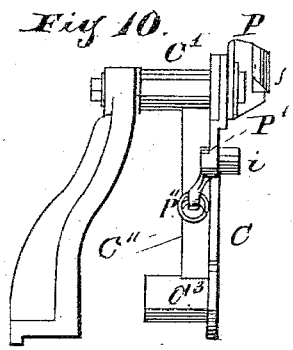
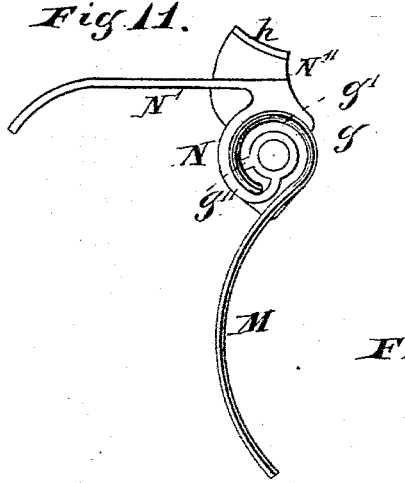
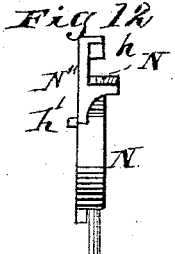
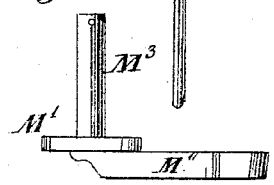
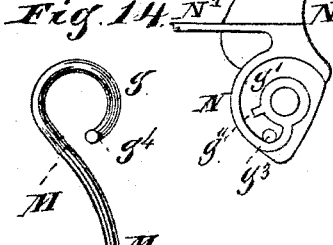
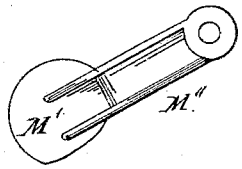
Witnesses:
Albert H. Adams
Edgar P. Bond
Inventors:
William W. Marsh
Maurice E. Blood
By West & Bond
Their Attys.

(Model.) 12 Sheets—Sheet 8.

W. W. MARSH & M. E. BLOOD.
GRAIN BINDING HARVESTER.

No. 321,511. Patented July 7, 1885.

Witnesses:
Albert H. Adams.
Edgar S. Bond.

Inventor:
William W. Marsh
Maurice E. Blood
By West & Bond
Their Attys.

(Model.)

12 Sheets—Sheet 9.

W. W. MARSH & M. E. BLOOD.
GRAIN BINDING HARVESTER.

No. 321,511.

Patented July 7, 1885.

Witnesses:
Albert H. Adams
Edgar Bond

Inventors:
William W. Marsh
Maurice E. Blood
By West & Bond
Their attys.

(Model.)  12 Sheets—Sheet 10.
W. W. MARSH & M. E. BLOOD.
GRAIN BINDING HARVESTER.
No. 321,511. Patented July 7, 1885.
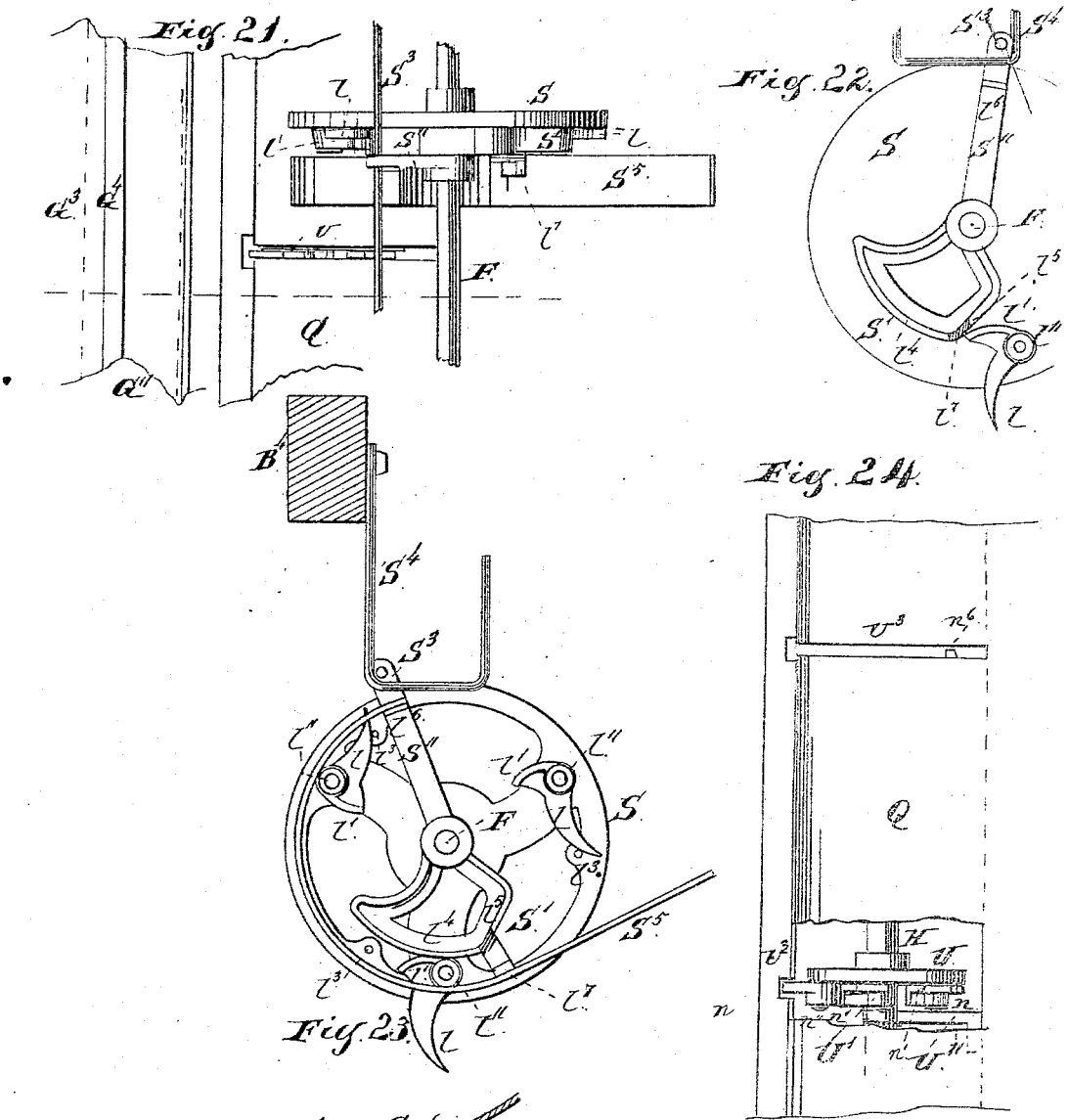
Witnesses:
Albert H. Adams
Edgar S. Bond
Inventors.
William W. Marsh,
Maurice E. Blood,
By West & Bond
Their Attys.

(Model.)

12 Sheets—Sheet 11.

W. W. MARSH & M. E. BLOOD.
GRAIN BINDING HARVESTER.

No. 321,511.

Patented July 7, 1885.

Witnesses:
Albert H. Adams
Edgar T. Bond

Inventors:
William W. Marsh,
Maurice E. Blood,
By West & Bond,
Their Attys.

(Model.) 12 Sheets—Sheet 12.

W. W. MARSH & M. E. BLOOD.
GRAIN BINDING HARVESTER.

No. 321,511. Patented July 7, 1885.

Witnesses:
Albert H. Adams,
Edgar T. Bond

Inventors:
William W. Marsh,
Maurice E. Blood,
By West & Bond,
Their attys.

UNITED STATES PATENT OFFICE.

WILLIAM W. MARSH AND MAURICE E. BLOOD, OF SYCAMORE, ILLINOIS.

GRAIN-BINDING HARVESTER.

SPECIFICATION forming part of Letters Patent No. 321,511, dated July 7, 1885.

Application filed April 25, 1883. (Model.) Patented in Canada May 27, 1884, No. 19,420.

*To all whom it may concern:*

Be it known that we, WILLIAM W. MARSH and MAURICE E. BLOOD, residing at Sycamore, in the county of De Kalb and State of Illinois, and citizens of the United States, have invented new and useful Improvements in Grain-Binding Harvesters, of which the following is a full description, reference being had to the accompanying drawings, in which—

Figure 18:
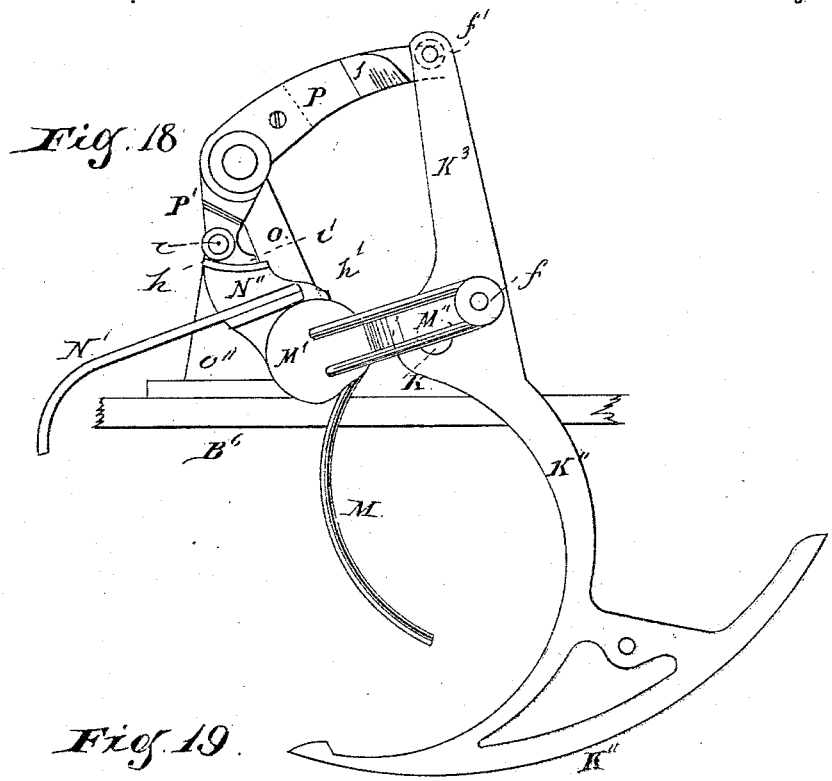
Figure 19:
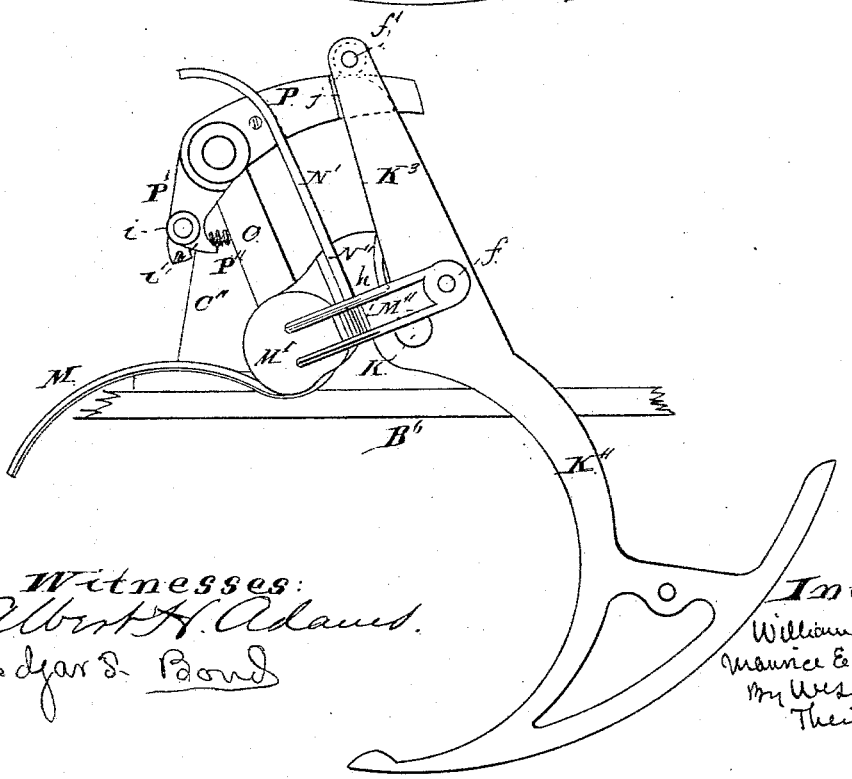
Figure 20:
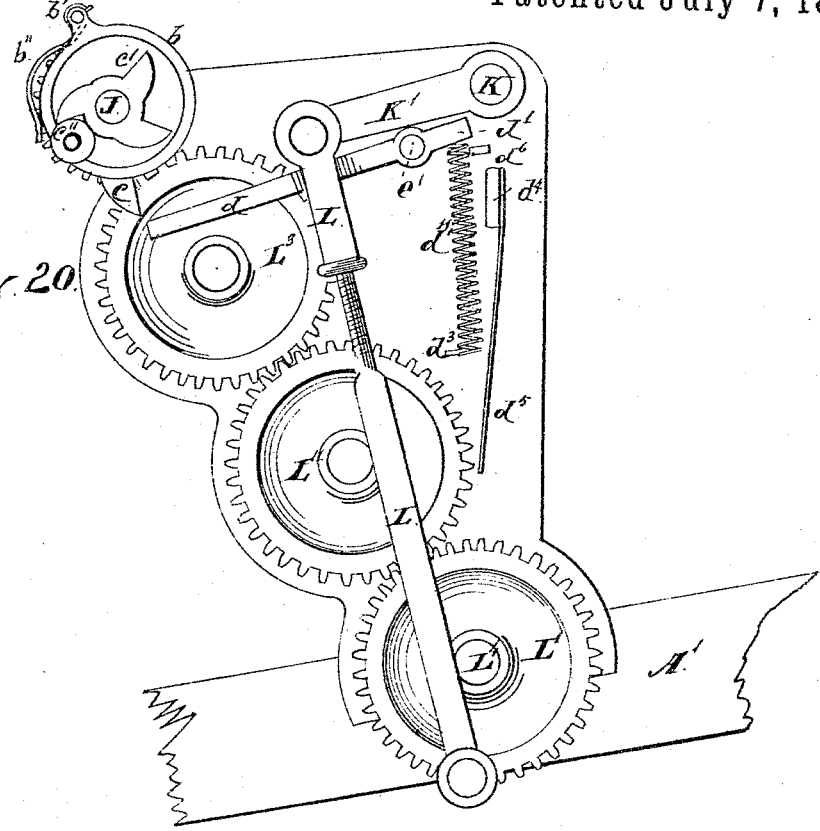
Figure 31:
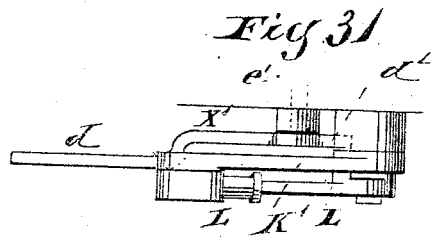
Figure 25:
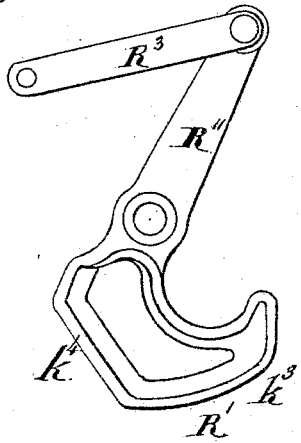
Figure 26:
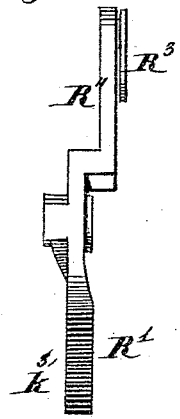
Figure 27:
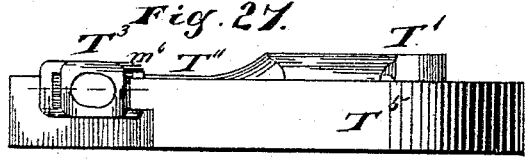
Figure 28:
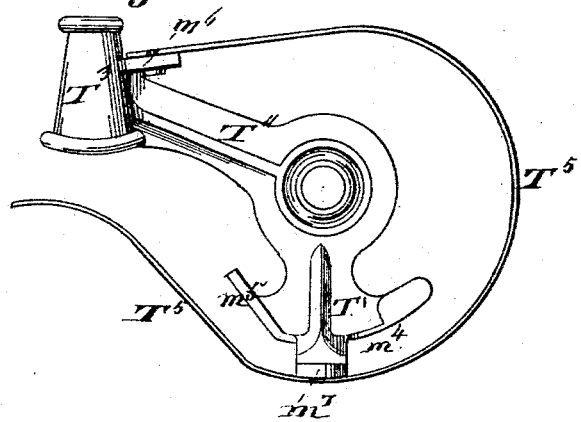
Figures 29, 30:
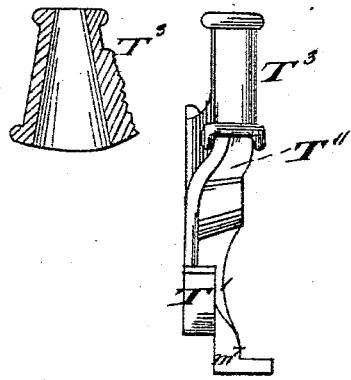
Figure 32:
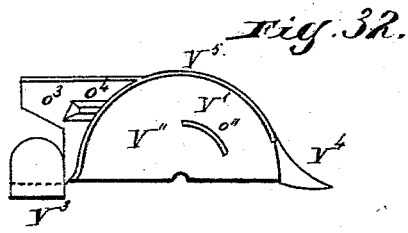
Figure 36:
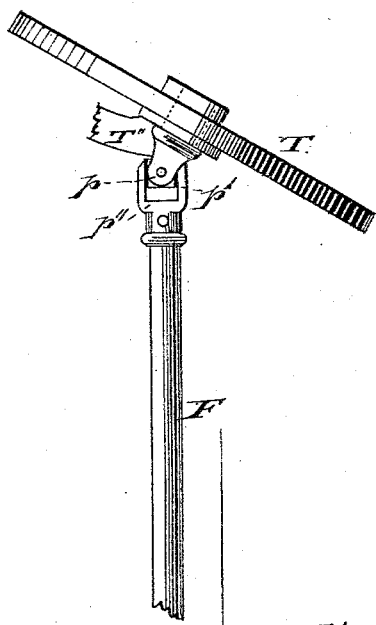
Figure 33:
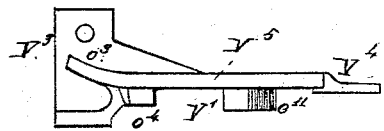
Figure 34:
Figure 35:
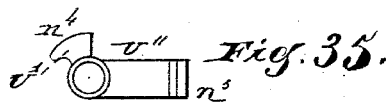
Figure 37:
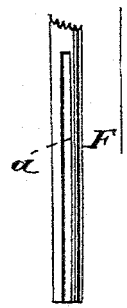

Figure 1 is a top or plan view with the grain end of the receiving-platform broken off; Fig. 2, a transverse section on a line at the rear of the binding-arm, looking toward the arm; Fig. 3, a front elevation; Fig. 4, a rear elevation showing only the frame-work, the driving devices, and the lever for changing the position of the grain-adjusting devices; Fig. 5, a plan view of the grain-adjusting devices and the lever for changing their position, showing also a portion of the frame-work; Fig. 6, a top or plan view of the binding-arm and the compressing devices; Fig. 7, a side elevation of the parts shown in Fig. 6; Fig. 8, an under side view of the compressing devices with the binder-arm removed; Figs. 9 and 10, a side and rear elevation, respectively, of the swinging pendant, the roller, and tripping-cam of the compressing-devices; Figs. 11 and 12, a side and rear elevation, respectively, of the compressing-arm and its support; Fig. 13, an end view of the locking-roller and its support; Fig. 14, a side view of the compressor-arm; Fig. 15, a side view of the compressor-arm support; Figs. 16 and 17, plan and side view, respectively, of the pitman for operating the compressor-arm from the binding-arm; Figs. 18 and 19, side views showing different positions of the binding-arm and compressing devices; Fig. 20, a detail of the machine, showing the binding-arm, pitman, and the tripping device when the binding mechanism is clutched to the harvester ready to operate. Fig. 21 is a plan, and Fig. 22 is a side view, of the auxiliary packer-disk, one of its teeth, and the cam for actuating the latter; Fig. 23, a view, partly in section, showing the relative positions of the receiving and binding platforms and the auxiliary packer, and showing, also, one of the picker-wheels at the delivery end of the binding-platform; Fig. 24, a top view of part of the binding-platform and one of the picker-wheels; Figs. 25 and 26, side and end views of the cam and its operating-pitman for the main packer. Figs 27, 28, and 29 are views of the grain-adjusting device; Fig. 30, a section of the socket or support on which the adjuster swings; Fig. 31, Sheet 9, a top or plan view of the binder crank and pitman and the clutch-finger; Figs. 32 and 33, side and plan views, respectively, of the cam and guard of the front picker-wheel; Figs. 34 and 35, similar views of the cam for the platform picker-wheels; Fig. 36, a plan of the adjuster-wheel and its driving-shaft, and Fig. 37 a cross section of the driving-shaft of the adjuster.

Figs. 2, 3, 4, 5, and 6 are enlarged as compared with Fig. 1, and Figs. 7 to 37 are still further enlarged.

This invention relates to certain improvements in that class of grain-binding harvesters in which the grain is delivered from the sickle upon a receiving-platform, and carried thence to a platform to be bound without being elevated above the main or drive wheel, and in which a cord is used for binding the gavel; but the mechanisms for binding and manipulating the grain are applicable to other forms of harvesters.

The invention will be first described in detail, and the improvements afterward pointed out in the claims, a preliminary explanation being therefore deemed unnecessary.

In the drawings similar letters of reference indicate corresponding parts.

The finger-beam or front sill, A, of the receiving-platform has attached to its front face the guard-fingers, through which the sickle plays, as usual. This sill is made of a piece of angle-iron, and from the point where it terminates as the finger-beam proper it is continued with an upward and forward inclination, as shown in Figs. 1, 2, and 3, to form the front sill or beam of the main machine-frame. The result of giving the continuation A' an upward inclination is that a separate front sill for the main frame of the machine is dispensed with, and by giving this beam A' a forward inclination a clear space is left for the discharge of the bundle without the butt-end coming in contact with the sill and being held up while the head drops and is dragged on the ground as the machine moves forward. The rear sill A″ of the grain-platform runs parallel with the front sill, A, as usual, and a cross-piece, A³, is provided at the inner end of the receiving-platform, and at the outer or grain end the ordinary divider and grain-wheel is to be provided.

To the under side of the sills A A″ is secured a bottom, A⁴, and at the inner end is secured a strip or bottom piece, A⁵, for the purpose of holding up and protecting the picker-teeth, and between the bottom pieces, A⁴ A⁵, is a cross-piece, A⁶, for supporting the inner end of the binding-platform, as shown in Figs. 2 and 23. The rear sill B of the main frame of the machine is supported at its front end by standards B′, secured to and extending up from the rear platform-sill, A″. The cross-sills B″ B³ are arranged at the required distance apart for the location of the main or drive wheel between them, and are secured at their rear ends to the rear sill B. The front ends of the cross-sill B″ B³ are secured and held in position by brackets Y Y′, attached to the sills and to the angle-iron A′. The cross-sill B⁴ is attached at its rear end to the sill B and at its front end to the inner reel-post, B⁵, and the reel-posts B⁵ are arranged to support and carry a reel-shaft and reel, (not shown,) as usual. The support B⁶ for the binder-frame and the grain-adjusting devices is attached at the inner end to the cross-piece B⁴ and at the outer end to the cross-piece B³, at the proper point to furnish the required support for the binder-frame and the adjuster. The driving-wheel C is mounted upon a shaft, C′, supported in suitable bearings on the cross-pieces B″ B³, and has on one face a gear-wheel, C″, by means of which power is imparted for driving the several mechanisms in any usual and well-known manner. The shaft D is supported in suitable bearings (not shown) on the cross-piece B″ and driven by suitable gearing from the wheel C″, and has on its rear end a sprocket-wheel, D′, over which and the wheels E′ F′ G′ H′ a chain, D″, is carried for the purpose of driving the grain binding and packing devices, the grain-adjusting devices, and the picker-wheels, as shown in Fig. 4. The wheel E′ is secured to the end of a shaft, E, which shaft at one end is supported in suitable bearings in the end of a standard, E³, secured to and extending up from the rear sill, B, and the other end is supported in a bearing located on the binder-frame. This shaft E drives the grain packing and binding devices. The wheel F′ is mounted on the shaft F, and is secured to the shaft by means of a feather located in a groove, a, so that the shaft is free to slide endwise and at the same time locking the wheel to the shaft so as to revolve the shaft. The shaft F projects beyond the wheel, and its end is supported in an opening, a′, in a bracket, F″, which opening a′ is of larger diameter than the diameter of the shaft, as shown in Fig. 4, to permit the shaft to rise and fall at the opposite end. The wheel G′ is mounted on the end of a shaft, G, on which is secured the inner roller, G″, by which the platform-carrier is driven. The platform-carrier, as shown, is of canvas, G³, with cross-strips G⁴, but may be of some other form of construction. The wheel H′ is secured to the end of a shaft, H, on which are mounted the picker-wheels, and this shaft H and the shaft G are arranged in such relation to each other as to leave a sufficient space between them for the picker-teeth to just clear the grain-carrier. The driving chain D″ is supported by suitable pulleys, I I″. one of which, I, is mounted on a swinging support, I′, by which it can be made to operate as a tightener, to keep the chain in proper working condition. The shaft E has secured thereto at its forward end a wheel, E″, which meshes with the wheel J″ on the rear end of a shaft, J, which is mounted in suitable bearings in the upper forward end of the side pieces, X′, of the main binder-frame, and the opposite end of this shaft J has mounted loosely thereon a pinion, J′, and to this shaft, outside of the pinion J′, is keyed or secured a clutch by which the pinion J′ is thrown in and out of gear. The binder-arm shaft K is mounted in suitable bearings in the upper part of the binder-frame. On the rear end thereof is secured the binding-arm K″, and on its opposite end is secured the crank K′ for operating it. The binding-arm has a rearward extension or tail-piece, K³, on the outer end of which is a roller, f″, which locks and unlocks the compressing devices during the movement of the binding-arm, as hereinafter specified. The pitman L is, at its lower end, connected with a wrist-pin on the gear-wheel L′, and at its upper end is connected with a wrist-pin on the crank K′ of the binder-arm shaft K. The gear L′ meshes with the idler L″, which idler meshes with an idler L³, which in turn meshes with the pinion J′. By this means power is communicated from the pinion J′ to the gear-wheel L′ to operate the binding devices. The compressing finger or arm M is constructed of round spring-steel or other suitable material, the acting portion being curved to suit the shape of the bundle, while its upper end, g, is coiled, as shown in Figs. 11 and 14, and turned at its extreme end at a right angle to form a connection, g⁴. The pitman M″ is provided with a plate, M′, having at its center a pin or pivot, M³, upon which it moves. The three parts are cast in one piece. One end of the pitman is pivotally connected with the binder-arm at a point a little above the shaft K by a pin, f. The head N is made with a groove, g′, on one face to receive the portion g of the compressing-finger M, the end g⁴ of which enters the hole g³, and a little above this hole g³, on one side of the groove g′, is a lug, g″, (shown in Figs. 11 and 15,) which forms a fulcrum on which the coiled part g of the compressor bears. The groove g′ encircles the center of the support N, which center has a hole through which the pin M³ of the pitman passes, and the groove g′ is made larger than the compressor-rod for the purpose of allowing freedom of movement to the compressor M. When the compressor M is in position in N, it is kept in place by means of the flange or plate M' of the pitman, which comes in contact, or nearly so, with the face of N, as shown in Figs. 6 and 7, and forms a lock for the part g. The support N has an upward-projecting arm, N'', and a rearward or tail extension, N'. The arm N'' has its upper end, h, curved to form a track against which the roller i bears to keep the compressor locked and in its proper position while it is operating upon the grain, as hereinafter described. The tail-piece, N', travels in contact with the roller f' on the tail of the binder-arm, so that when the binder-arm is raised in its highest position the roller f' will bear on the extension N' and hold the compressor in position for doing the compressing. The swinging arm or pendant O has at its lower end a box or bearing, O³, to receive the pin or pintle M³ of the pitman M'', and its upper end is provided with a box or bearing, O', for the passage of a bolt or pin, by means of which the arm or pendant is pivotally supported from the upper end of a standard, O'', the lower end of which is secured in any suitable manner to the cross-piece B⁶. This arm or pendant O swings in the arc of a circle from the movement of the binding-arm, through the pitman M'', causing the compressor-arm to have a corresponding movement. The arm P is made of a piece of spring-steel or other suitable material that will yield without breaking, and has near its forward end a projection or cam, j, the face of which is inclined, as shown in Figs. 6, 7, and 8, and the forward edge of which is also inclined, as shown in these same figures. This arm P is located in such relation to the binding-arm as to bring the cam j in the path described by the roller f' on the tail K³ of the binder-arm, so that as the tail is elevated the end of the roller will come in contact with the inclined side face of the cam j, and the arm P will yield, allowing the roller to pass, and after the roller has passed the arm springs back into its normal position, bringing the forward inclined edge or face of the cam beneath the roller f'', so that on the return movement of the tail K³ the roller will travel over this face of the cam and press the arm down. The end of this arm P is firmly attached to the end of an arm, P', encircling the pin or bolt which connects the arm O to its support. This arm P' extends downward from its pivotal point, and has connected thereto one end of a spring, P'', the other end of which is connected to the pendant or arm O. This end of the arm P' has a projection, i', which comes in contact with the edge of the arm O, and forms a stop to limit the movement of the arm in that direction; and it has secured to its side face a roller, i, arranged to ride on or over the track or face h of the extension N'' of the head carrying the compressor. The spring P'' allows the arm P' to rise as the arm P is depressed by the action of the roller f', and also acts to return the arms P P' to their normal position after the roller has passed over the cam j. The roller i, combined with the track or face h, forms a lock for the compressor-arm. While the two are engaged, as shown in Figs. 6, 7, and 8, and when so locked the compressor M and its head or support N, tail piece or guide N', extension N'', and arms P P', with the pendant O, all move as one piece in the operation of the devices when compressing.

The trip-shaft e', for operating the tripping devices which throw the binding-gear into operation, is mounted in suitable bearings in the frame X, supported on the cross-piece B⁶, and has on its rear end an arm or finger, e, located and arranged to lie between the compressor M and binding-arm when down, against which finger the grain for the gavel as it is packed into place comes, and when a sufficient quantity for the bundle has been packed in the grain lifts this trip-finger, permitting the engagement of the binding-gear with the harvester through the arm d, located on the forward end of the shaft e', which arm at its free end, when the binder is at rest, engages with a finger or stop, c, and holds the pinion J' against rotation; but as the finger or arm e is raised the free end of d is disengaged from c by being thrown down, as shown in Fig. 20, releasing the finger c and allowing the pinion J' to rotate and drive the gears L' L'' L³ and operate the binding devices, which devices are not shown, but may be of any usual construction, located beneath the binding-platform at the proper point to coact with the binding-arm. The arm or finger d has a rearward extension, d', to which is connected one end of a spring, d'', the other end of which is connected to an ear, d³, on the front X' of the main binder frame, which spring is for the purpose of throwing the free end of d up when the trip-finger passes from the bundle as the bundle is discharged, bringing the end d in contact with the stop c, disengaging the clutch and the pinion J', and stopping the movement of the binder. The trip is arranged in such relation to the binding-arm as to start the binding-mechanism at a time when the binding-arm is in a position to descend into the grain, and it will also stop the movement of the binder again upon the return of the binding-arm to that same position. The ring b, carrying the locking-roller c'', is held against the clutch, when the roller and clutch are engaged together, by a spring, b''.

The gear-wheel with the wrist-pin that connects with the pitman to operate the binding-arm are the only means resorted to for holding and preventing the binding-arm from falling.

The binding-platform Q is made of sheet metal or other suitable material, and is located and arranged to allow the grain to pass thereon from the receiving-platform to be bound and discharged, its form and arrangement being shown in Figs. 1 and 2. Its receiving end is curved or bent down and attached to the cross-piece A⁶, as shown in Fig. 23, and covers the picker-wheels, being provided with suitable slots for the passage of the teeth of such wheels, and this receiving end is arranged in such relation to the delivery end of the grain-carrier as to allow the ready passage of the grain from the carrier onto the platform.

The packing-wheel for forcing the grain into position to be bound, as shown, is a circular disk, R, on the face of which is pivoted a series of teeth, each having an acting portion, $k$, and a tail, $k'$, each tooth being pivoted, as shown, between the face of the wheel or disk R and a bracket or support, $k''$, secured to the wheel or disk near its periphery, and the brackets or supports $k''$ also form stops to limit the backward movement of the teeth in the form of construction shown. The teeth are projected and held in that position by a cam, R'. This cam R' may be of the form shown, having an open web projecting out from a hub or center, as in Fig. 25, or the web may be solid. The acting face of this cam is formed of a curved section, $k^3$, and inclined section $k^4$, as shown in Figs. 25 and 26, the curved section engaging with the heel $k'$ of the teeth and holding the acting portion of the teeth projected, and the inclined portion $k^4$ allowing the teeth to fold gradually and come within the periphery of the wheel or disk R out of working position, as shown in Fig. 2. This cam R' is varied in its position to coact with the binding-arm by an arm, R'', extending out from the hub or center and connected by a pitman, R³, with the binding-arm, as shown in Fig. 2, by which means the acting face of the cam will be thrown farther forward as the arm is elevated, and farther back as the arm descends, the backward position being one that will cause the teeth when projected to be non-acting on the grain. The operation of this cam and the action on the teeth in holding them projected in an acting and non-acting position is substantially the same as that described in the Patent No. 275,681, dated April 10, 1883, granted to us, and the cam R' is essentially the same as the cam shown and described in the said patent, except that it is provided with the inclined face $k^4$, to cause the teeth to be gradually folded inward, and is a single cam instead of a double one. This cam R' is mounted loosely on the end of the shaft J, outside of the wheel or disk R, so that its position can be varied by the movement of the binding-arm. The gear J'' is secured to or cast with the wheel or disk R, and it is protected against the entrance of straw or grain by a guard, R⁴, which guard is of peculiar construction, and is attached at one end to the cross-piece B⁴ and at the other end to the cross-piece B³. It has a downward curve at the end attached to the cross-piece B⁴, to pass underneath the gear J'', and thence an upward curve at a point over the binding-table where the gavel lies to be bound, to form with the face of the table a throatway or passage for the bundle by which it is somewhat compressed in a vertical direction, and it has a short downward curve at the end attached to the cross-piece B³, which forms a deflector for giving the bundle, when discharged, a downward direction. The auxiliary packer is mounted upon the shaft F so as to revolve therewith, and is formed of a circular disk or wheel, S, as shown in Figs. 21, 22, and 23, which carries teeth having an acting portion, $l$, with a heel, $l'$, pivoted to the face of the wheel or disk by a suitable pin or pivot, $l''$, which teeth are held from dropping too far inward at their working ends, as shown, by pins or stops $l^3$. These teeth are actuated by a cam, S', similar in construction to the cam R', and having a curved acting face, $l^4$, and inclined face $l^5$. This cam is mounted loosely on the shaft F in proper position to act on the teeth, and is connected by an arm, S'', from a spring rod or bar, S³, one end of which is secured in the rear sill, B, and the free end of which is held so as to have both vertical and lateral play to a limited extent by a support or hook, S⁴, as shown in Figs. 22 and 23. This rod S³ controls the cam S' to suit the condition and quantity of the grain. If the grain accumulates in large quantities while the binding-arm is down, the spring-rod S³ allows the cam and the packer to rise vertically to suit the depth of grain, the rising movement being permitted by the enlarged opening $a'$ for the rear end of the shaft F, and if the grain is very compact and causes an increased pressure on the teeth the spring-rod S³ will be carried inward laterally by the pressure of the heel of the teeth as they pass over the inclined face $l^5$, moving the cam backward, allowing the teeth to yield without creating an injurious pressure on the teeth or the cam or the packer-wheel, and when the pressure is released the rod returns to its normal condition, forcing the cam forward to its working position, and the wheel will drop to its normal position by the force of gravity when the depth of grain is reduced on the platform sufficiently for that purpose. The cam is forced backward into the position shown in Fig. 22 when an extreme pressure is on the tooth, turning its point backward, and forcing its heel into contact with the inclined face $l^5$, as shown in this Fig. 22, in which position the full force of the tooth is not on the grain, as will be readily seen by comparing the position of the teeth as shown in Figs. 22 and 23, and when in the position shown in Fig. 22 the grain will not be carried forward to the same extent as when in full working position. A guard, S⁵, is provided to prevent the entrance of grain to interfere with the operation of the packer-teeth, one end of this guard is attached to a flange, $l^6$, near the upper end of the arm S'', and the guard is curved from that point to conform to the circle of the wheel to a point near the terminus of the curved face of the cam S' when in working position, as shown in Fig. 23, and it is held and supported at its free end by being attached to an arm, l', projecting out from the cam S', as shown in Fig. 23, or in some other suitable manner.

The butt-adjuster is connected with the forward end of the shaft F by means of a universal coupling consisting of a fork, $p$, attached to the hub or center of the cam, a block, $p'$, pivoted between the arms of the fork $p$, and a fork, $p''$, attached to the end of the shaft, and between the arms of which the block $p'$ is pivoted—the connection being one that allows the adjuster to swing both laterally and vertically. This adjuster is formed of a circular disk or wheel, T, to the face of which are pivoted a series of teeth, each tooth having an acting portion, $m$, and a heel, $m'$, pivoted to the face of the wheel or disk T by a suitable pin or pivot, $m''$, and, as shown, a stop, $m^3$, is provided for the acting end of the teeth to strike and hold the teeth from falling too far inward or back. The teeth are projected and held in working position by a cam, T', located adjacent to the wheel or disk, and having a curved face, $m^4$, for holding the teeth projected, and an inclined face, $m^5$, for folding them gradually. This cam T' is mounted loosely on the pin or pintle of the fork $p$, to which the wheel or disk T is secured, and extending out from the hub or center of the cam is an arm, T'', the outer end of which terminates in a hub or socket, T³, as shown Figs. 28, 29, and 30, which head or socket has a central longitudinal opening to receive a pivot or pin, T⁴, the upper end of which opening corresponds in diameter, or nearly so, to the diameter of the pin, and the lower end of which is enlarged in a direction parallel with the side face of the adjuster to form a tapering slot which allow the adjuster to swing laterally and vertically, and at the same time the upper end of the socket T³ forms a connection which allows the adjuster to swing or turn on the pin or pivot T⁴. The pin or pivot T⁴ depends from a plate or bracket attached to the cross-piece B⁶, and between the upper end of the socket T³, and the plate or bracket is left a sufficient space to allow the socket to rise vertically, to adapt the adjuster to the depth of grain passing under it. The socket T³ and the pin or pivot T⁴ support the forward end of the shaft F through the arm T'' (shown in Figs. 2 and 28) and the hub or center of the cam T', leaving this end of the shaft perfectly free to rise and fall to permit the adjuster to adapt itself to the amount of grain being carried forward on the platform, and this manner of supporting the adjuster and the auxiliary packer on a shaft which is free to rise and fall and to swing laterally permits the grain to accumulate during the operation of binding the gavel. The pin or pivot T⁴ is located to bring the pivotal point in line, or nearly so, with the periphery of the disk or wheel T on the inner edge, and above the center of the wheel or disk, as shown in Fig. 2, and the socket is held in position on the pin or pivot by a pin, a key, or other device passing through or located on the end of the pin T⁴, which projects below the lower end of the socket, on which cross-pin or support the socket rests when at its lowest point, as shown in Fig. 2. The head or socket T³ has a flange or ear, $m^6$, projecting out therefrom, to which is secured one end of a guard, T⁵, which guard encircles the cam T', as shown in Fig. 28, and is connected to the cam by a pendant or lug, $m^7$, and its free end extends some distance beyond the end of the cam, which guard prevents grain from entering and interfering with the operation of the teeth, and also acts as a cleaner for clearing the teeth as they are folded, as does also the guard S⁵ for the auxiliary packer S.

The picker-wheels are mounted on the shaft H, as many being used as are necessary to pass the grain from the delivery end of the carrier to the receiving end of the binding-platform. As shown, four of these picker-wheels are provided; but a greater or less number may be used. Each picker-wheel consists of a rim or disk, U, on the face of which are pivoted a series of teeth, each tooth having an acting portion, $n$, and a heel, $n'$, and each pivoted to the rim or disk by a suitable pin or pivot, $n''$, and, as shown, the acting portion of each tooth is kept from being folded too far back or inward by a stop or pin, $n^3$. The teeth are operated and held projected by a cam, U', mounted loosely on the shaft H, against the acting face $n^4$ of which the heel $n'$ of the teeth comes in contact, to project the teeth and hold them projected; and from the center or hub of the cam U' projects out an arm, U'', the outer end, $n^5$, of which is secured to the face of the cross-piece A³, as shown in Fig. 23, by means of which the cam is held in position. The cam U' is located and arranged to hold the teeth projected while passing through the slot U³ in the receiving end of the binding-table, as many slots being provided as there are picker-wheels, and the wheels are so located that the teeth will be projected above the upper surface of the receiving end of the platform Q, and this receiving end of the binding-platform, being curved down and over the wheels or disks, forms a guard to prevent grain from passing in and interfering with the operation of the pickers, as well as a support for holding the grain, and, as shown, in order to insure the folding of the teeth, a stop, $n^6$, is provided on the under face of the platform Q at each slot U³, against which the teeth will strike and be turned or folded back, the stop $n^6$ being located in such relation to the cam U' as to fold the tooth backward after the heel $n'$ has passed from the cam. As shown, the arm U' has its end $n^5$ turned at right angles, and provided with a hole for attaching the arm to the cross-piece A³; but the attachment could be made in some other suitable manner. The inner end of the shaft H has mounted thereon a wheel or disk, V, carrying a series of teeth, each tooth having an acting portion, $o$, and a heel, $o'$, the teeth being pivoted to the wheel, and having stops to prevent them from falling too far back, and being similar in construction to the teeth $n$ $n'$ of the picker-wheels, except that their acting portions are longer, the wheel V being of a greater diameter than the picker-wheels. This wheel V is located between the front face of the finger-beam A and the sickle, as shown in Fig. 1, the location being one to bring the wheel in close proximity to the heel of the sickle and just back of the cutting-line, so that it will act to keep the heel of the sickle and the inside divider clear of the grain, and also act on the grain near the butt-end; and this wheel V is made larger than the picker-wheels, to enable it to act and carry the butts forward faster than the body of the grain is carried by the picker-wheel, thereby straightening the grain before it passes onto the delivery end of the platform to some extent. The acting end $o$ of each tooth is projected in succession and held projected by the heel $o'$ coming in contact with the curved face $o''$ of the cam V', which cam projects out or is attached to a plate or support, V'', which is secured by a flange, $V^3$, to a casting or support, $V^6$, which carries the inner reel-post, the flange $V^3$ being bolted or otherwise attached to a lateral flange, $o^5$, projecting out from the portion of the support which receives the reel-post, as shown in Figs. 1 and 3, and the detailed Figs. 32 and 33. The plate V'' has on its upper edge a flange, $V^5$, which forms a guard to prevent the grain from passing in and interfering with the operation of the wheel V and its teeth, and on the forward end of this plate is a nose, $V^4$, which extends forward and passes beyond the front face of the inside divider and forms a support for the butts in being acted on by the wheel V. As shown, the plate V'' has a rearward extension, $o^3$, on which is a lug, $o^4$, which projects inward and forms a stop for the acting end of the teeth to strike against, and insure the teeth being folded back or inward, the stop being located to act on the teeth as the heel thereof leaves the cam V'. The nose $V^4$ also forms a guard at the front against the entrance of grain to interfere with the teeth. The lever W is pivotally connected by a pin or pivot, $q$, to an arm or bracket, W'', attached to the rear sill, B, which arm or bracket has on its end a rack, W', with the teeth of which a projection on the lever W engages to lock and hold the lever in its adjusted position. The outer end of this lever extends up so as to be within reach of the driver, and its other end is connected with a pin, $r$, which pin projects out from a thimble, $r'$, loosely mounted on the shaft F, and held in position against longitudinal or end play by pins $r''$, one at each end passing through the shaft F. The shaft F is loose in its bearings, so as to have free end play, as before described, and by means of the lever W this shaft can be moved endwise, as required, to bring the auxiliary packer and the adjuster in proper relation for carrying the grain, such endwise movement of the shaft moving the auxiliary packer to or from the binding-arm, and setting the adjuster to act on the grain nearer to or farther from the butts by changing the angle at which it stands in relation to the binding-arm, such change in the angle being allowed by the pivotal connection of the socket or head $T^4$, and the universal joint connecting the wheel with the end of the shaft.

The different positions of the auxiliary packer and the adjuster in relation to the grain and the binding-arm or binder are shown in Figs. 1 and 5. As shown in Fig. 1, the adjuster extends parallel with the binding-arm and the auxiliary packer, and, as shown by the full lines in Fig. 5, the adjuster stands at an angle to engage the grain at a point farther removed from the butts, and the auxiliary packer is carried farther away in relation to the binding-arm than in Fig. 1, in which position the tendency of the action of the adjuster is to draw the grain toward the front of the machine, changing the direction of the flow for the proper encompassing of the gavel by the binding-cord, and, as shown by the dotted lines in Fig. 5, the adjuster is set at an angle to engage the grain nearer the butts, and the auxiliary packer is brought closer to the binding-arm, in which position the tendency of the adjuster is to draw the grain away from the front of the machine and deliver it to the binder in proper position for binding. The full lines indicate the position the adjuster usually occupies when binding long grain, and the dotted lines its position for binding short grain. The auxiliary packer slides back and forth with the shaft on the rod $S^3$, and the object in changing its position as the angle of the adjuster is changed is to cause it to act properly on long and short grain, and move the grain squarely toward the binder.

The binder-frame is made of cast-iron or other suitable material, consisting of a main or body portion, X, supported on the cross-pieces $B^3$, $B^4$, and $B^6$, and uprights $B^5$ and Y, with side pieces or arms, X', and is to be formed so as to furnish the necessary support and bearings for the shafts E, J, and K, the tripping-shaft $e'$, and the gearing for driving the binding devices from the shaft J, and is supported by the front sill or angle-iron and cross-piece $B^6$. The brackets or posts Y Y' are made of cast-iron or other suitable material, either of the form shown or such other form as will furnish a support for the front ends of the cross-pieces B'' $B^3$, and connect them with the front sill or angle-iron, A'. The divider Z is of the usual construction, located and operating in the usual manner. It will be noticed that the drive-chain D'' passes over the wheel E' and under the wheel F' and over the wheel G', and by this arrangement it will be seen that the chain has an upward lift on the shaft F, which shaft carries the auxiliary packer-disk S and the adjuster-disk T, the end of the shaft extending beyond the wheel and passing through the bracket bearing or support F''. This bracket-bearing on the frame-piece B for the shaft F, forms a fulcrum against which the wheel lifts, and assists in raising the inner end of the shaft, in case of severe labor on the auxiliary packer and the adjuster. The bearing for the shaft is made large enough to permit of the variation required to allow the opposite end of the shaft to rise and fall, said shaft having a pivotal bearing in the journal. As any increase in the labor of these devices requires an increased power for driving them, and as such increase in the driving power is applied by the chain which passes under the wheel F', the tendency of the chain to straighten between the pulleys E' and G' lifts the wheel, thus raising or swinging the free end of the shaft on its fulcrum or pivot, and relieving the pressure on the devices from the grain.

The tying devices are actuated from the wheel L' through the shaft L⁴, one revolution of the wheel L' being required to complete the tying, and this wheel L' also operates, through the pitman L, the binding-arm. The wheel L' is twice the diameter of the pinion J', requiring two revolutions of the pinion for one of the wheel, during which the clutch has to be engaged and the arm d held disengaged from the stop c as the pinion begins its second revolution, and this is accomplished in the construction shown by the binder-arm crank K', in line with which the finger d comes, so that as the binding-arm is at or near the limit of its downward throw the crank bears on the finger d and holds it depressed until the stop c has passed a point where it would engage with the end of the finger d, and as the binding-arm commences to rise the crank is lifted, allowing the spring d'' to throw the end of the finger d up to have its end engage the stop c, and, as shown, the upward movement is limited by a stop, d⁶, on the side or end piece of the main binder-frame. (Shown in Fig. 20.) The compressor M swings on its pivot f, secured to the binding-arm, until the arm O, with the crank P, having the roller i, is released from contact with the track or face h on the arm N'' until again locked to the compressor by the engagement of the roller i and the track h, at the completion of the upward movement of the binding-arm, and is held in its normal position when the binding-arm is raised by the engagement of the roller f' with the tail-piece N', and when so locked the tail-piece N' is held from falling by a lug or projection, h', on the face of N'', which engages with the edge of the standard O and limits further downward movement of the tail, except as the standard or arm O is inclined.

Fig. 7 shows the position of the compressor, binding-arm, and the actuating devices for the compressor when the binding-arm is elevated. Fig. 18 shows the position of these parts when the binding-arm is down and the binding is being performed, and Fig. 19 shows the position of these parts when the binding is completed and the binding-arm commences its upward movement, at which time the compressor is released and elevated to allow the bundle to be discharged. The compressor is released by the roller f' bearing down on the cam j of the arm P, depressing such arm and raising the arm P', removing the roller i from contact with the face h, which leaves the compressor to hang loose and free to rise as the bundle is discharged from the binder.

The operation is as follows: The grain as cut falls upon the platform, and is carried toward the delivery end by the carrier G³, and when it reaches the delivery end the picker-wheels act thereon and pass the grain from the delivery end of the carrier onto the receiving end of the binding-table, the large picker-wheel between the sickle and the finger-beam acting to carry the butts forward faster than the heads of the grain are carried, and serving to partially straighten the grain when the heads are in advance, as it is delivered onto the receiving end of the binding-platform. The picker-wheels deliver the grain onto the binding-platform at a point where it will be taken by the auxiliary packer and the adjuster to be carried, the picker-wheels and the auxiliary packer and the adjuster being located and arranged in relation to each other so that when the picker-wheels cease to act on the grain the auxiliary packer and the adjuster will act thereon, making the movement of the grain a continuous one toward the binding devices. The auxiliary packer acts straight on that portion of the grain which lies at the rear of the binder-arm, while the adjuster acts on that portion of the grain, and near the butts, which is forward of the binding-arm, the adjuster being set at different angles in relation to the binding-arm and auxiliary packer, as before described, to move the grain forward or back, as required for binding purposes; and this adjuster and the auxiliary packer are self-adjustable vertically to suit the depth of grain being carried forward, and the accumulation by the free vertical play of the forward end of the shaft F, as already described, and the angle at which the adjuster stands and the relative position of the auxiliary packer lengthwise of the grain are adjusted by means of the lever W, through which the shaft F can be moved endwise. The auxiliary packer and the adjuster rotate continuously, and when the binding-arm is elevated the grain passes beneath it to the place where it is to be bound, and when the binding-arm is down it acts as a stop against the inflowing grain, making the separation required between the grain and the gavel for the bundle, the inflowing grain accumulating beneath and in rear of the auxiliary packer and the adjuster, which rise, as already described, and permit such accumulation until the binding-arm is elevated, allowing the grain to again pass beneath it to the place where it is bound. The grain, as it comes from the auxiliary packer and the adjuster, is taken by the main packer and carried to the binding-receptacle. This main packer is located between the auxiliary packer and the compressor and in close proximity to the binding-arm, its location being one that will cause it to act on the grain for the gavel at or near the center longitudinally, and as close to the binding-arm as practicable, and also in line, or nearly, so with the compressor and the trip, the object being to pack the grain close to the compressor and the binding-cord, and in a direct manner to prevent twisting or turning of the gavel in the receptacle, and keep the grain as parallel as practicable. This packer acts in conjunction with the binding-arm—that is, when the binding-arm is elevated the cam which projects the teeth is in position to hold the teeth so that they will be non-acting on the grain. The compressor is held in position to act against the grain when the binding-arm is elevated by the engagement of the roller $i$ with the face $h$, which locks the parts together, as already described, and while the gavel is being formed the trip-finger is down and remains in that position until a sufficient quantity of grain has been received for the bundle, when the grain acts on this finger and raises it, which movement depresses the end of the finger $d$, allowing the clutch $c'$ to engage the roller $c''$ and drive the pinion $J'$ to start the binder. As the binder starts the binding-arm descends, and through the pitman $M''$ draws the compressor forward or toward the arm, compressing the bundle between the compressor and the binding-arm, the compressor in this operation yielding to suit the size of the gavel, through the play between the coil $g$ and its receiving-groove $g'$ and the elasticity of the finger $M$ and coil $g$. When the binding is completed and the binder-arm starts on its return movement, the compressor is unlocked by the action of the tail $K^3$ on the arm $P$, as already described, and as shown in Fig. 19, leaving the compressor free to swing back out of the way of the bundle as it is discharged. The compressor will again be returned to its acting position after the bundle has been discharged, by the action of the roller $f'$ on the tail-piece $K^3$, acting on the tail $N'$ to lock the compressor by the engagement of the roller $i$ and track $h$ at the completion of the upward movement of the binding-arm. When the binding-arm has reached its highest elevation, the finger $d$ on the trip-shaft $e'$ will be in position to engage the stop $c$, to disengage the clutch $c'$ from the roller $c''$, thereby stopping further movement of the binder until operations are further resumed to bind the next bundle.

What we claim as new, and desire to secure by Letters Patent, is as follows:

1. The sprocket wheels or pulleys $D'$, $E'$, $F'$, $G'$, and $H'$, and tightener $I I'$, in combination with a drive chain or belt, $D''$, for rotating the packing devices through the shaft $E$ and gear $E''$, and driving the grain-adjusting devices, platform-carrier, and pickers through their shafts $F$, $G$, and $H$, respectively, as shown and described.

2. The combination of the sprocket wheels or pulleys $E'$ $F'$ $G'$, and their shafts, and the drive-chain engaging therewith, as and for the purpose described, adapted for raising the shaft $F$ by straightening the chain when increased labor is brought to bear upon the chains, substantially as and for the purpose specified.

3. A suspended and revolving disk or wheel having fingers or teeth to engage the grain mounted on the end of a shaft that is free to rise and fall by swinging on a pivot at its opposite end, in combination with a driving-pulley mounted on said shaft between the disk or wheel and the pivot-point, and a driving-chain acting on the pulley in such manner that when increased labor is brought upon the chain the disk or wheel will be raised by the action of the chain, substantially as and for the purpose specified.

4. A suspended and revolving disk or wheel having fingers or teeth to engage the grain, and a driving-pulley, both mounted on a shaft that is free to rise and fall, in combination with a driving-chain operating on the pulley in such manner that the shaft will be raised by the tendency of the chain to lift the pulley and disk or wheel when increased strain is brought upon the chain, for the purpose specified.

5. The combination of a vertically-revolving grain-adjuster adapted to stand at varying angles in relation to the grain, and a vertically-revolving packer or carrier, both having fingers or teeth to engage the grain, and both rotated by a driving-shaft, on which they are mounted, and means for driving such shaft, substantially as and for the purpose described.

6. The combination of a vertically-revolving grain-adjuster and a vertically-revolving packer, both having fingers or teeth to engage the grain, and both rotated by a shaft, on which they are mounted, the adjuster being adapted to be turned at varying angles in relation to the grain, and the packer to be moved bodily or squarely lengthwise of the grain, and means for adjusting the adjuster and packer simultaneously, substantially as specified.

7. A suspended or revolving wheel or disk adapted to stand at varying angles in relation to the grain, and a vertically-revolving wheel or disk which stands squarely with the grain, both having fingers or teeth to engage the grain, in combination with a shaft carrying both wheels, which is free to rise and fall to allow the wheels to ride over varying thicknesses of grain, substantially as and for the purpose specified.

8. A suspended and revolving grain-adjuster adapted to be turned at varying angles in relation to the grain, and a suspended and revolving packer adapted to move squarely lengthwise of the grain, both provided with fingers or teeth to engage the grain, in combination with a driving-shaft, on which both are mounted and rotated, and means for moving said driving-shaft endwise to change the position of the packer and adjuster simultaneously, substantially as described.

9. The swinging-adjuster consisting of a wheel, T, with teeth, and the auxiliary packer consisting of a wheel, S, with teeth, both mounted on and rotated by the driving-shaft F, in combination with the lever M, for moving said shaft endwise and changing the positions of the packer and adjuster, substantially as and for the purpose specified.

10. The driving-shaft F, carrying and rotating the vertically-revolving packer and adjuster, provided with fingers or teeth to engage the grain and move it toward the binder, and pivotal bearing F'', at one end of the driving-shaft, in combination with supports T'' and T³, swinging on the arm T⁴, substantially as and for the purposes specified.

11. The vertically-revolving and horizontally-swinging adjuster consisting of the wheel T, having teeth, in combination with the arm or support T'' and T³, and stationary pin T⁴, passing through the tapering slot in T³, for allowing the adjuster to swing both laterally and vertically, substantially as and for the purpose specified.

12. The picker-wheels U, having pivoted teeth $n$, constructed as shown, and operated by a fixed cam, U', in combination with the binding-platform Q, having slots U³, for the passage of the teeth, and the cross-piece A⁶, serving as a step to catch the grain scattered from the apron and hold it until the picker-teeth take it away, and to which is secured the lower end of the binding-platform, all substantially as shown, and for the purpose specified.

13. The picker-wheel U, cam U', and arm U'', in combination with the cross-sill A³, supporting the binding-platform Q and guard A⁵, all substantially as described, and for the purpose set forth.

14. The combination, with the carrier G³ and picker-wheels U, having teeth $n$ pivoted thereon, and operated by a stationary cam, U', of a grain-adjuster and an auxiliary packer, which are located and operate on the opposite side of the grain from the pickers, substantially as specified, and for the purposes set forth.

15. The combination of the main packer, grain-adjuster, and auxiliary packer, all suspended above the grain, and each consisting of a disk provided with teeth, of the picker-wheels U, having pivoted teeth $n$ and carrier G³, located beneath the grain, for delivering the grain to the binding receptacle, substantially as specified.

16. The combination of the shaft J, located in bearings on the main frame X', and having its inner end terminating in close proximity and adjacent to the binder-arm, and having located thereon, between the binder-arm and frame X', the packer consisting of the wheel R, having pivoted teeth and swinging cam R', attached to the arm or crank R'', and connected by link R³ with the binding-arm for projecting the teeth, substantially as and for the purposes specified.

17. A vertically-revolving wheel or disk, R, having on one face a gear by which it is rotated, and carrying on its opposite face a series of pivoted fingers or teeth to engage the grain, in combination with a shaft, E', and gear-wheel E'', substantially as and for the purpose specified.

18. A vertically-revolving wheel or disk R, having on one face a gear by which it is rotated, and carrying on its opposite face a series of fingers or teeth to engage the grain, in combination with a guard, R⁴, for protecting the teeth and guiding the grain while entering and passing out from the binding-receptacle, substantially as specified.

19. The packer consisting of the wheel R, having fingers or teeth pivoted thereon, and operated by a cam, R', on the arm R'', and link R³, in combination with the trip $e$, finger $d$, stop $c$, spring $d''$, and crank K', all operating substantially as set forth, and for the purpose specified.

20. The combination of a binding-arm and a compressing-arm with a pitman, M'', provided with a locking cam or face, and the lever P P', provided with the locking-roller $i'$, and means for operating the lever P P' to lock and unlock the compressor, substantially as described.

21. The combination, with a binding-arm and a compressing-arm, M, of a pitman, M'', having the locking cam or face $h$, the lever P P', having the tripping-cam $j$, and tripping-roller $f'$ on the heel of the binder-arm, substantially as described, and for the purpose specified.

22. The combination, with a binding-arm and a compressing-arm, M, of a pitman, M'', a locking device for holding the compressor locked, a roller $f'$ on the tail K³ of the binding-arm, and an arm, N', on the pitman M, co-operating with the roller $f'$, for forcing the compressor into position to be locked, substantially as described.

23. The combination, with a binding-arm and a compressor, M, of a pitman, M'', swinging pendant O, locking-roller $i$, locking-cam $h$, roller $f'$, tail-piece K³, binding-arm K'', arm N', and spring-arm P', having the cam $j$, substantially as and for the purpose specified.

24. The combination, with a binding-arm and a compressing-arm, M, of a locking-roller, $i$, locking-cam $h$, unlocking-cam $j$, and roller $f'$, and a binding-arm, substantially as and for the purposes specified.

25. The packer-wheel S, having teeth $l$, with heel $l'$, in combination with a cam having a face, $l^4$, for projecting and holding the teeth in working position, and an inclined face, $l^5$, arm $S''$, and yielding support $S^3$, substantially as shown, and for the purpose specified.

26. The plate $V''$, carrying a cam, $V'$, and provided with a flange, $V^5$, and a nose, $V^4$, in combination with a toothed disk or wheel, $V$, substantially as and for the purposes specified.

WILLIAM W. MARSH.
MAURICE E. BLOOD.

Witnesses:
A. M. STARK,
C. N. PRITCHARD.